United States Patent
Choi et al.

(10) Patent No.: US 7,685,397 B2
(45) Date of Patent: Mar. 23, 2010

(54) APPARATUS AND METHOD FOR MANAGING STACKS IN VIRTUAL MACHINE

(75) Inventors: Young-ho Choi, Gunpo-si (KR); Hyo-jung Song, Seoul (KR); Jung-pil Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 456 days.

(21) Appl. No.: 11/706,354

(22) Filed: Feb. 15, 2007

(65) Prior Publication Data

US 2007/0214322 A1 Sep. 13, 2007

(30) Foreign Application Priority Data

Mar. 10, 2006 (KR) .................. 10-2006-0022872

(51) Int. Cl.
*G06F 12/00* (2006.01)

(52) U.S. Cl. .................. 711/170; 711/154; 712/41; 712/42; 718/104

(58) Field of Classification Search .......... 711/170, 711/154; 718/104; 712/41, 42
See application file for complete search history.

(56) References Cited

U.S. PATENT DOCUMENTS

| | | | | |
|---|---|---|---|---|
| 5,835,958 A | * | 11/1998 | Long et al. | 711/170 |
| 5,898,885 A | * | 4/1999 | Dickol et al. | 712/36 |
| 6,457,111 B1 | * | 9/2002 | Howard et al. | 711/170 |
| 6,594,708 B1 | * | 7/2003 | Slaughter et al. | 719/315 |
| 7,454,572 B2 | * | 11/2008 | Chu | 711/132 |
| 2004/0236927 A1 | | 11/2004 | Irie et al. | |

FOREIGN PATENT DOCUMENTS

| | | |
|---|---|---|
| JP | 2005-011349 A | 1/2005 |
| KR | 1998-079643 A | 11/1998 |
| KR | 1999-0081957 A | 11/1999 |
| KR | 10-2004-011193 A | 12/2004 |

* cited by examiner

*Primary Examiner*—Stephen C Elmore
(74) *Attorney, Agent, or Firm*—Sughrue Mion, PLLC

(57) ABSTRACT

An apparatus and method for managing stacks in a virtual machine are provided. The apparatus includes a first memory which checks the space of a stack chunk and allocates a frame pointer if at least one of a push and a pop are performed in a virtual machine; and a second memory which is connected with an external bus, and stores frame pointers copied from the first memory via the external bus.

9 Claims, 11 Drawing Sheets

APPARATUS AND METHOD FOR MANAGING STACKS IN VIRTUAL MACHINE

CROSS-REFERENCE TO RELATED APPLICATION

This application is based on and claims priority from Korean Patent Application No. 10-2006-0022872 filed on Mar. 10, 2006 in the Korean Intellectual Property Office, the disclosure of which is incorporated herein in its entirety by reference.

BACKGROUND OF THE INVENTION

1. Field of the Invention

Methods and apparatuses consistent with the present invention relate to managing stacks in a virtual machine. More particularly, the present invention relates to an apparatus and method for managing stacks in a virtual machine, which can reduce stack overhead by using memory directly connected with a processor when performing a push or pop on the stacks.

2. Description of the Related Art

Generally, a virtual machine provides a standard application performance environment that ensures mobility of an application. Here, a representative example of this virtual machine is Java Virtual Machine (JVM).

Java is an object-oriented programming language that can be used to produce platform-independent code. The Java code is compiled into Java byte code by a Java compiler, and the Java byte code is executed by the JVM.

Figure 1A:
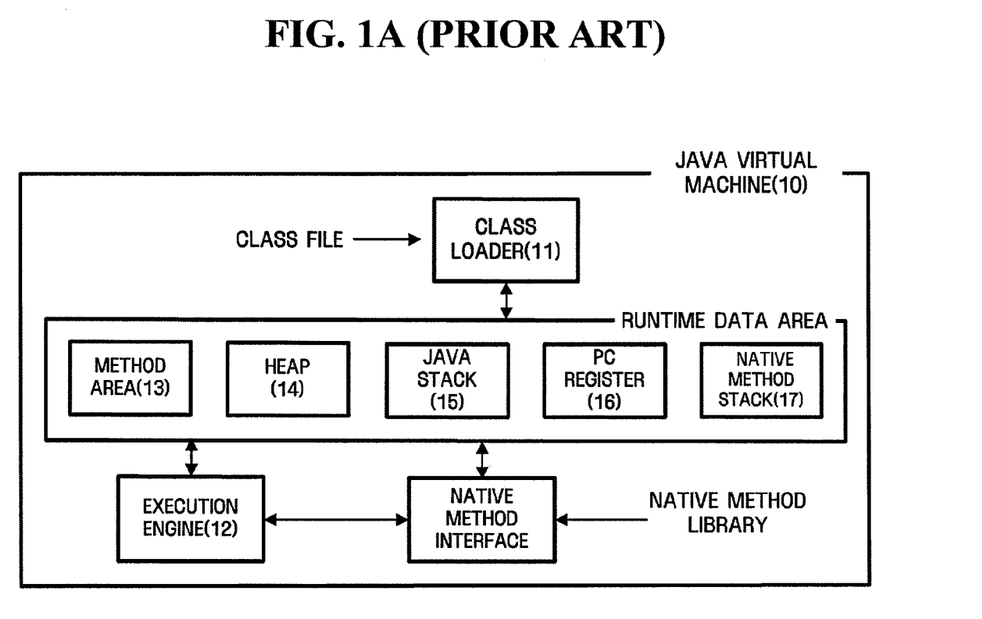
FIG. 1A illustrates the structure of a conventional Java Virtual Machine (JVM).

FIG. 1A illustrates the structure of a conventional Java Virtual Machine (JVM).

As illustrated, a JVM includes a class loader 11, an execution engine 12, a method area 13, a heap 14, a Java stack 15, a personal computer (PC) register 16, and a native method stack 17.

The class loader 11 reads a Java class file from a network or a file system, puts the file at an appropriate position in memory depending on internal information included in the class file, and initializes the internal state.

The execution engine 12, which is a component for executing execution code of a class, recognizes and executes JVM machine commands, and while executed, converts JVM commands into machine code of a central processing unit (CPU) so as to improve the speed.

Figure 1B:
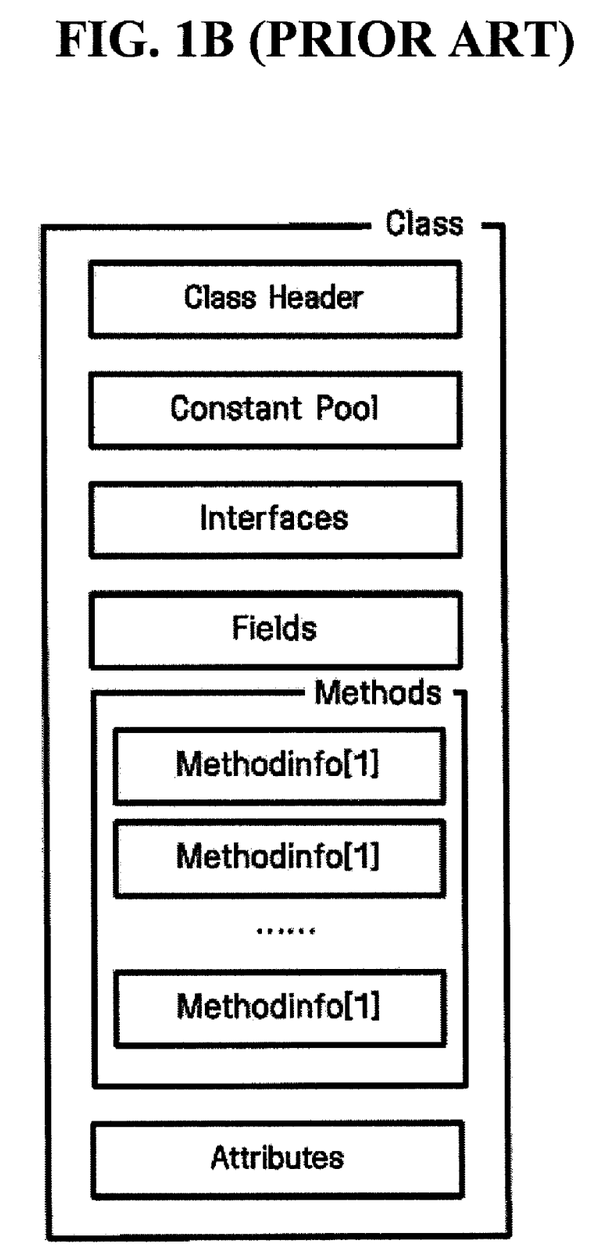
FIG. 1B illustrates the structure of a conventional Java class file.

FIG. 1B illustrates the structure of a conventional Java class file.

As illustrated, Java classes are generally transmitted or stored in a class-file format, and the class-file format includes various class-related attributes. Here, the class-file format consists of a class header that indicates basic attributes, a constant pool that manages all constants, interfaces that include information about an interface of a class file, fields that include information about files, and methods, which are stored as byte-code.

Figure 2A:
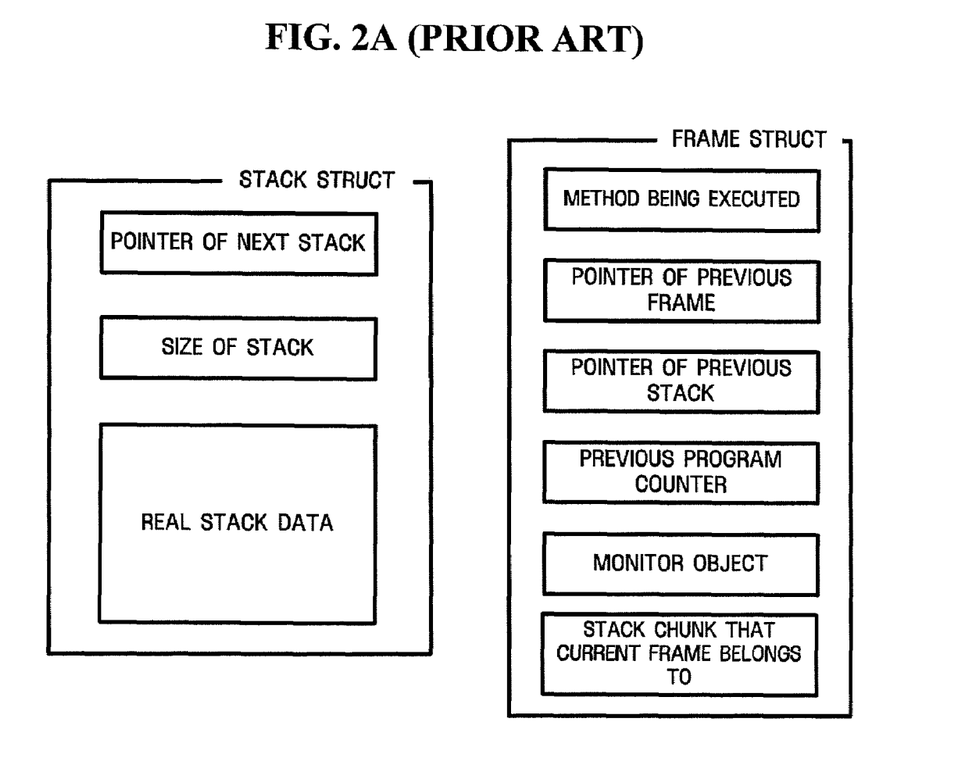
FIG. 2A illustrates a basic unit for management of a Java stack by a conventional JVM.

FIG. 2A illustrates a basic unit for management of a Java stack by a conventional JVM.

StackStruct is used to manage a stack chuck, and includes the size of a stack and pointer information of the next stack.

FrameStruct is used to manage a frame generated whenever a function is called, and includes information on a method being executed, the pointer of the previous frame, the pointer of the previous stack, the previous program counter, a monitor object, and a stack chunk that belongs to a current frame.

Figure 2B:
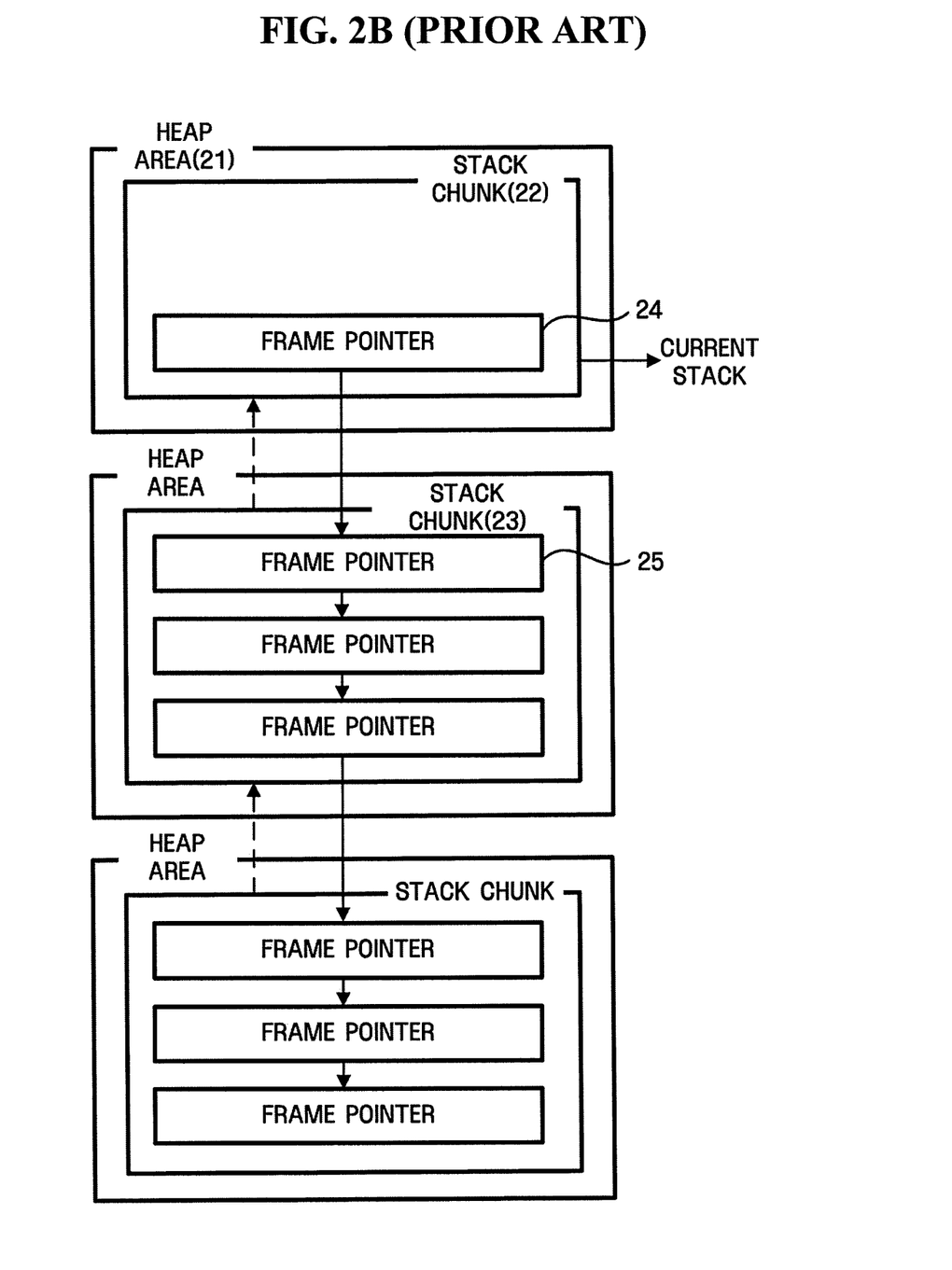
FIG. 2B illustrates a conventional stack-management structure.

FIG. 2B illustrates a conventional stack-management structure. Here, a process of managing stacks in a JVM 10 is described. The process of managing stacks occurs when performing a push and a pop.

First, in the case where a push is performed on stacks by calling a function in a class, it is checked whether a frame pointer can be added by checking the space of a stack chunk 23.

Then, if the space of the current stack chunk 23 is insufficient, it is checked whether there exists the next stack chunk. In the case where there exists no next stack chunk, a new stack chunk 22 is allocated from a heap area 21 in memory.

If a stack chuck 22 has been already allocated in the next chuck, the stack chunk 22 is specified as the current stack chuck.

Then, a frame pointer 24 is generated in the specified stack chunk 22, and the frame pointer 24 generated in the uppermost frame pointer is specified.

Then, the stack chunk of the current frame pointer 24 is specified as the stack chunk 22 of the allocated area.

Further, in the case where a pop is performed by calling a function, the current frame pointer 24 moves to the previous frame pointer, e.g., a frame pointer 25.

Then, the stack chunk of the current frame pointer 25 is specified as the stack chunk 23 that the current frame pointer 25 points to.

However, in the case where stacks are operated in the manner illustrated above, the stack area exists in a general memory area connected through an external bus.

As such, according to a conventional art, in order to handle data in memory, data in memory should be read to a register, but because data is read via an external bus, the transmission speed becomes low, which is a problem.

Korean Unexamined Patent 2004-111193 (Management of Stack-Based Memory Usage in a Processor) discloses a technology that determines whether a data subsystem is to operate as cache memory or as scratchpad memory in which line fetches from external memory are suppressed, and programs a control bit to cause the data subsystem to be operated as either a cache or scratchpad memory depending on the determination. However, this patent does not mention a technology that reads data from memory directly connected with a processor, which is not general memory connected to an external bus, when reading stacks.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above The present invention provides an apparatus and method for managing stacks in a virtual machine which may improve performance by reducing time for access to stacks by positioning stacks of the virtual machine in memory directly connected with a processor.

According to an exemplary embodiment of the present invention, there is provided an apparatus for managing stacks in a virtual machine, comprising a first memory that checks the space of a stack chunk and allocates a frame pointer if a push and a pop are performed in a virtual machine; and a second memory that is connected with an external bus, and stores frame pointers copied from the first memory via the external bus.

According to another exemplary embodiment of the present invention, there is provided a method of managing stacks in a virtual machine, comprising checking the space of a stack chunk in a first memory if a push is performed in a predetermined stack; checking whether there is a stack chunk allocated in a second memory if the space of the stack chunk is insufficient; copying frame pointers stored in the first memory to the stack chunk of the second memory if there is the stack chunk in the second memory; specifying the stack chunk of the first memory as the current stack chunk, and allocating a new frame pointer to the specified stack chunk; and specifying the frame pointer as the current frame pointer.

According to yet another exemplary embodiment of the present invention, there is provided a method of managing stacks in a virtual machine, comprising moving a current frame pointer to a previous frame pointer if a pop is performed in a predetermined stack; specifying the stack chunk that the current frame pointer points to as the current stack chunk; checking whether the specified stack chunk is positioned at the first memory; copying the stack chunk to the first memory if the stack chunk is not positioned at the first memory; and specifying the stack chunk positioned at the first memory as the current stack chunk.

BRIEF DESCRIPTION OF THE DRAWINGS

The above and other aspects of the present invention will become apparent by describing in detail exemplary embodiments thereof with reference to the attached drawings in which.

DETAILED DESCRIPTION OF EXEMPLARY EMBODIMENTS OF THE INVENTION

Exemplary embodiments of the present invention will be described in detail with reference to the accompanying drawings.

The present invention may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention. It should be understood that each block of the flowchart illustrations, and combinations of blocks in the flowchart illustrations can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operational steps to be performed in the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

Figure 3:
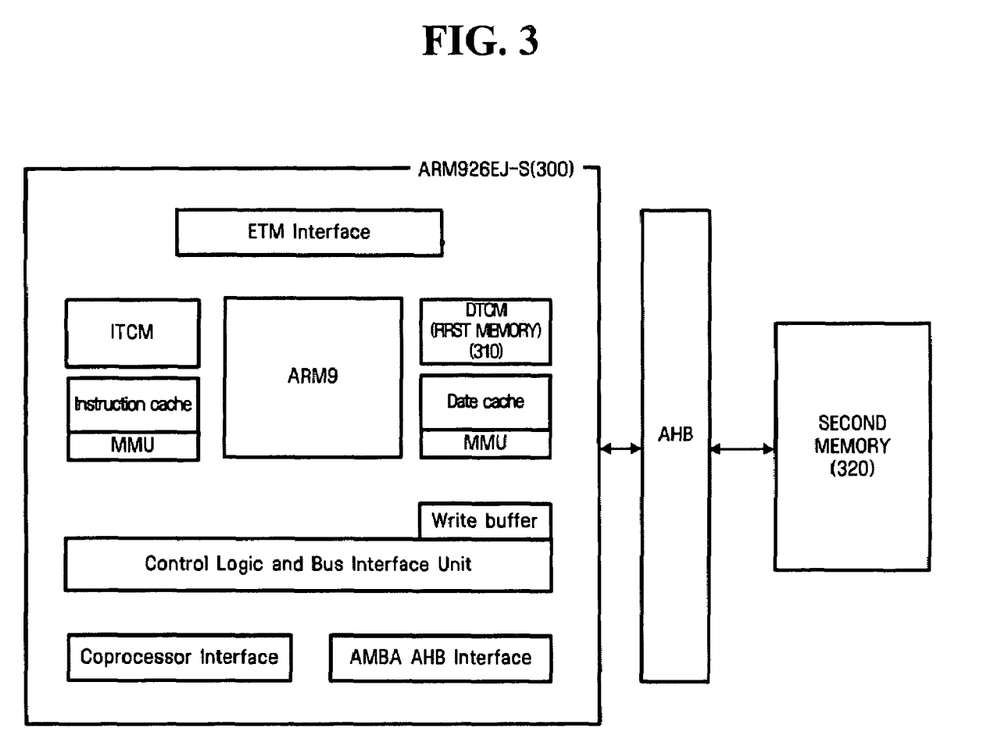
FIG. 3 illustrates a block diagram of an apparatus for managing stacks in a virtual machine according to an exemplary embodiment of the present invention.

FIG. 3 illustrates a block diagram of an apparatus for managing stacks in a virtual machine according to an exemplary embodiment of the present invention.

Exemplary embodiments of the present invention are not limited to a certain virtual machine, but can be applied to all types of virtual machines such as the Common Language Runtime (CLR) of Microsoft Corporation and Smalltalk. Further, for explanatory convenience, the Tightly-Coupled Memory (TCM) produced by ARM Ltd. is used in this description. However, this exemplary embodiment of the present invention is not limited to the TCM, but includes all types of memories that directly communicate with a processor.

As illustrated, the ARM926EJ-S microcell 300 is perfectly compatible, and includes a 32-bit Reduced Instruction Set Computer (RISC) CPU, a flexible instruction size, a data cache, a TCM interface, and a Memory Management Unit (MMU).

Further, the ARM926EJ-S microcell 300 supports separated instructions and a data bus, and is compatible with the Advanced Microcontroller Bus Architecture (AMBA) data bus that is compatible with the AHB interface, which is appropriate for the separated instructions and multilayer-AHB-based system.

Further, the ARM926EJ-S microcell 300 implements an instruction set, includes an improved 16×32-bit multilayer, and performs a single-cycle operation. Here, the instruction set includes a 16-bit fixed-point Digital Signal Processor (DSP) instruction, improves the performance of multiple signal-processing algorithms and applications, and supports execution of Java byte code.

Further, the ARM926EJ-S microcell 300 can execute most operating systems and middleware, and can implement a single Microcontroller Unit (MCU) DSP and Java solution. Further, it improves efficiency of the execution of Java byte code, consumes very little Java power, and improves performance of Java Just-In-Time (JIT) compiler. The ARM926EJ-S microcell 300 is applied to a next-generation smart phone, a Personal Digital Assistant (PDA), a third-generation base band, an application processor, a platform operating-system-based device, a digital still camera, an audio and video decoder, and others.

Further, a Data TCM (DTCM) (a first memory) 310 is a space for positioning a stack chunk in order to improve performance of a virtual machine. The DTCM includes one or more stack chunks and frame pointers.

Further, the DTCM 310 is a memory space that is used when a push and a pop are performed. In the case where the space for adding a new frame pointer is insufficient, the frame pointer stored in the DTCM 310 is copied to the second memory 320, and then a new frame pointer is allocated.

The second memory 320 is connected to an external bus (AHB), and includes multiple heap areas. Here, the second memory 320 refers to SDRAM, Double Date Rate SDRAM (DDR SDRAM), or Rambus DRAM (RDRAM).

Figure 4A:
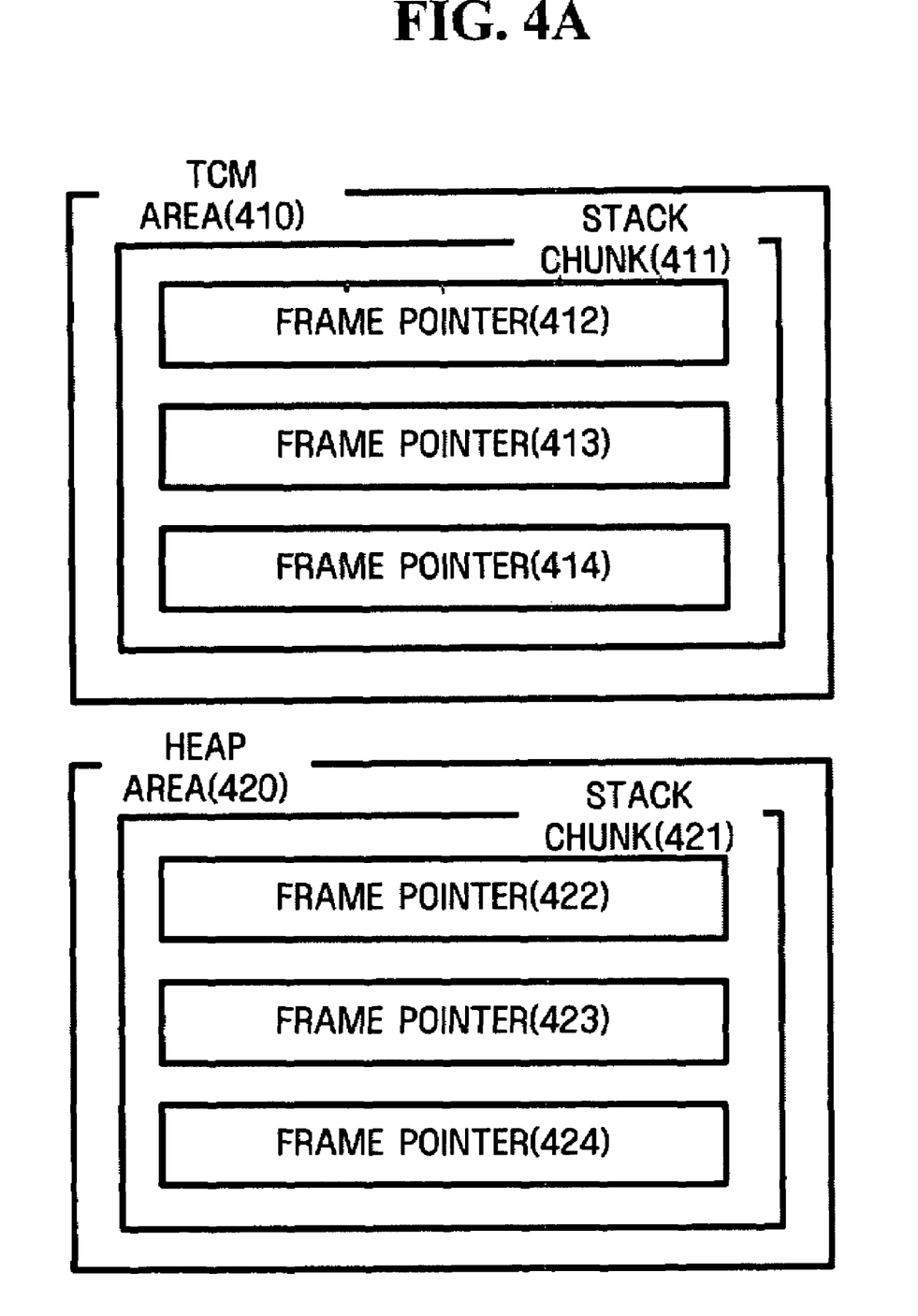
FIGS. 4A, 4B, and 4C illustrate operations of managing stacks in an apparatus for managing stacks in a virtual machine according to another exemplary embodiment of the present invention.
Figure 4B:
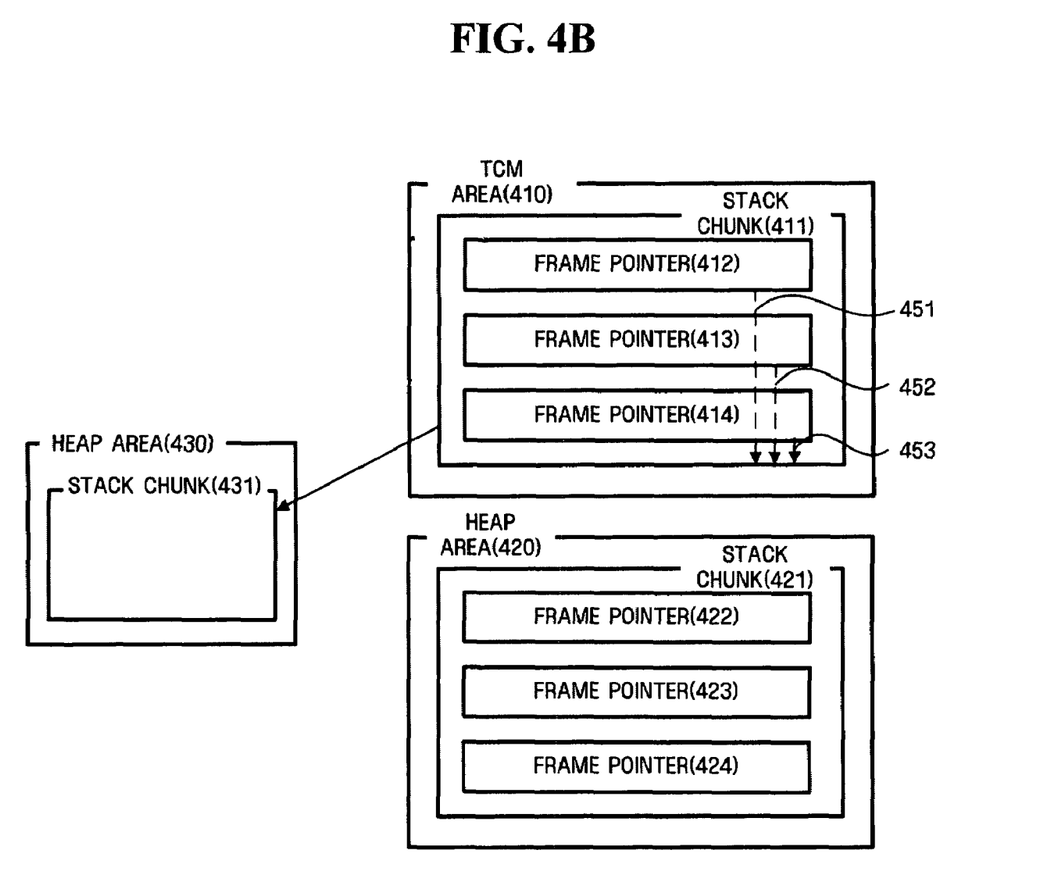
Figure 4C:
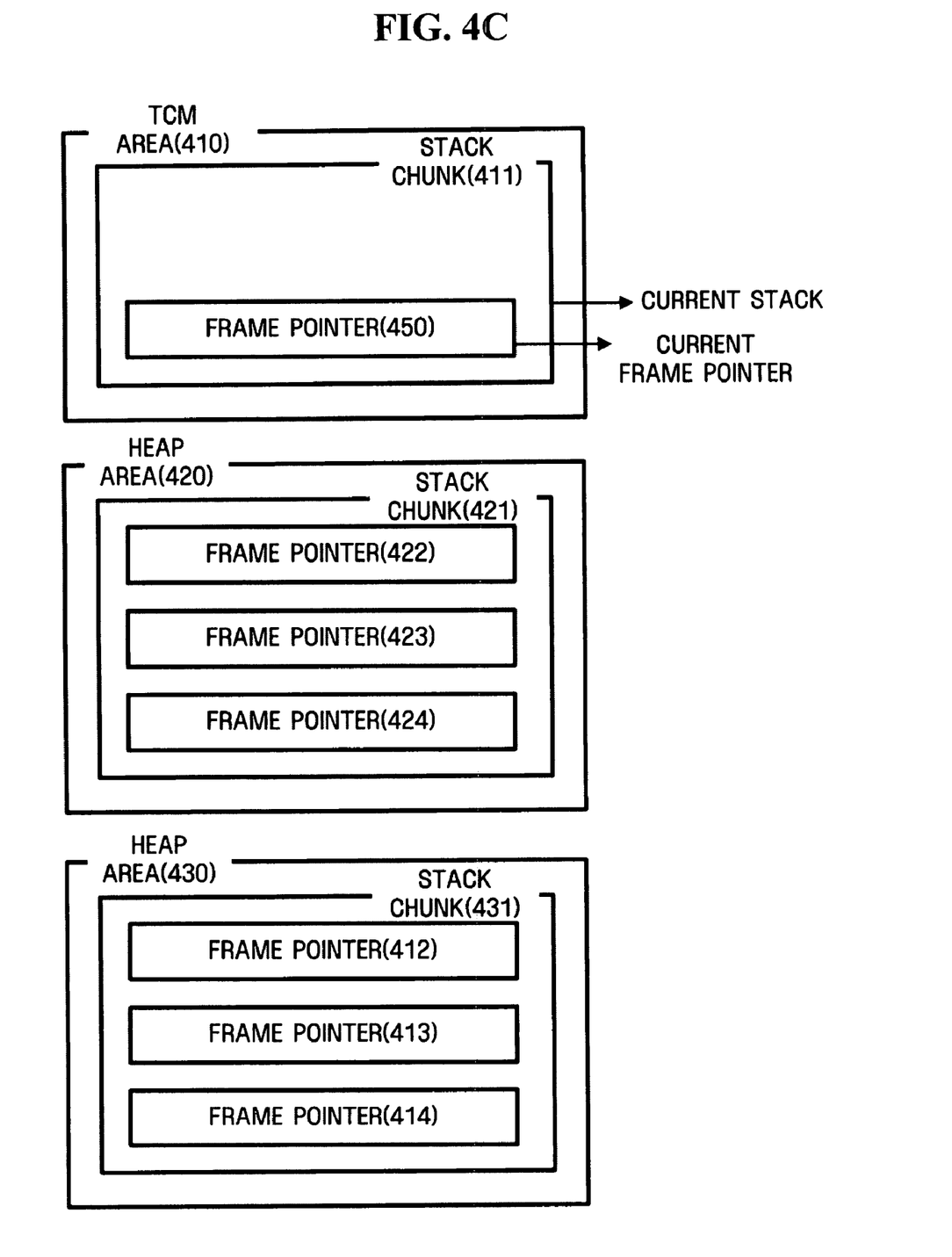

Further, the second memory 320 does not store the current stack chunk and frame pointer, but stores frame pointers copied from the DTCM 310. FIGS. 4A, 4B, and 4C show processes of managing stacks in a heap area that exists in the TCM area and the second memory.

Hence, an exemplary embodiment of the present invention manages a stack (or a pointer frame) being used in the DTCM (the first memory 310) of the ARM926EJ-S, and thus quickly performs operations of a virtual machine, which improves the performance.

FIGS. 4A, 4B and 4C illustrate operations of managing stacks in an apparatus for managing stacks in a virtual machine according to another exemplary embodiment of the present invention. Here, the TCM area includes one or more stack chunks and frame pointers.

As illustrated in FIG. 4A, in the case where a push is performed by calling a function, a stack chunk of the TCM area is checked in order to determine whether a new frame pointer (e.g., reference numeral 450 in FIG. 4C) can be added.

In the case where a frame pointer cannot be added because the space of the current stack chunk is insufficient, it is checked whether there is a stack chunk that has been already allocated in the next heap area (e.g., reference numeral 420). Here, the stack chunk allocated in the next heap area should have the sufficient space for storing frame pointers 412 to 414 that have been stored in the TCM 410.

In the case where there is no stack chunk that has been already allocated to the next heap area (e.g., reference numeral 420), a new heap area 430 is generated, and a stack chunk 431 is allocated, as illustrated in FIG. 4B.

Then, frame pointers 412 to 414, which have been stored in the TCM area 410, are copied to the stack chunk 431 of the allocated heap area 430.

Then, as illustrated in FIG. 4C, the stack chunk 411 of the TCM area 410 is specified as the current stack chunk, and a new frame pointer 450 is allocated to the current stack chunk 411. Then, the frame pointer 450 is specified as the current frame pointer.

Further, in the case where there is a stack chunk 421 that has been already allocated in the next heap area (e.g., reference numeral 420), the frame pointers 412 to 414, which have been stored in the TCM area 410, are copied to the stack chunk 421. Here, the process of generating a new heap area 430 is omitted.

Further, when copying a stack to the TCM area 410, a linked list can be changed to an offset type in order to optimize the performance, and can position the next stack in another memory area.

For example, as illustrated in FIG. 4B, after measuring relative distances 451 to 453 between the bottom address of the stack chunk 411 and each frame pointer, difference in relative distance is calculated based on the measured relative distances. Then, if the frame pointer is copied to the next stack chunk, the frame pointer can be positioned based on difference in relative distance.

Figure 5:
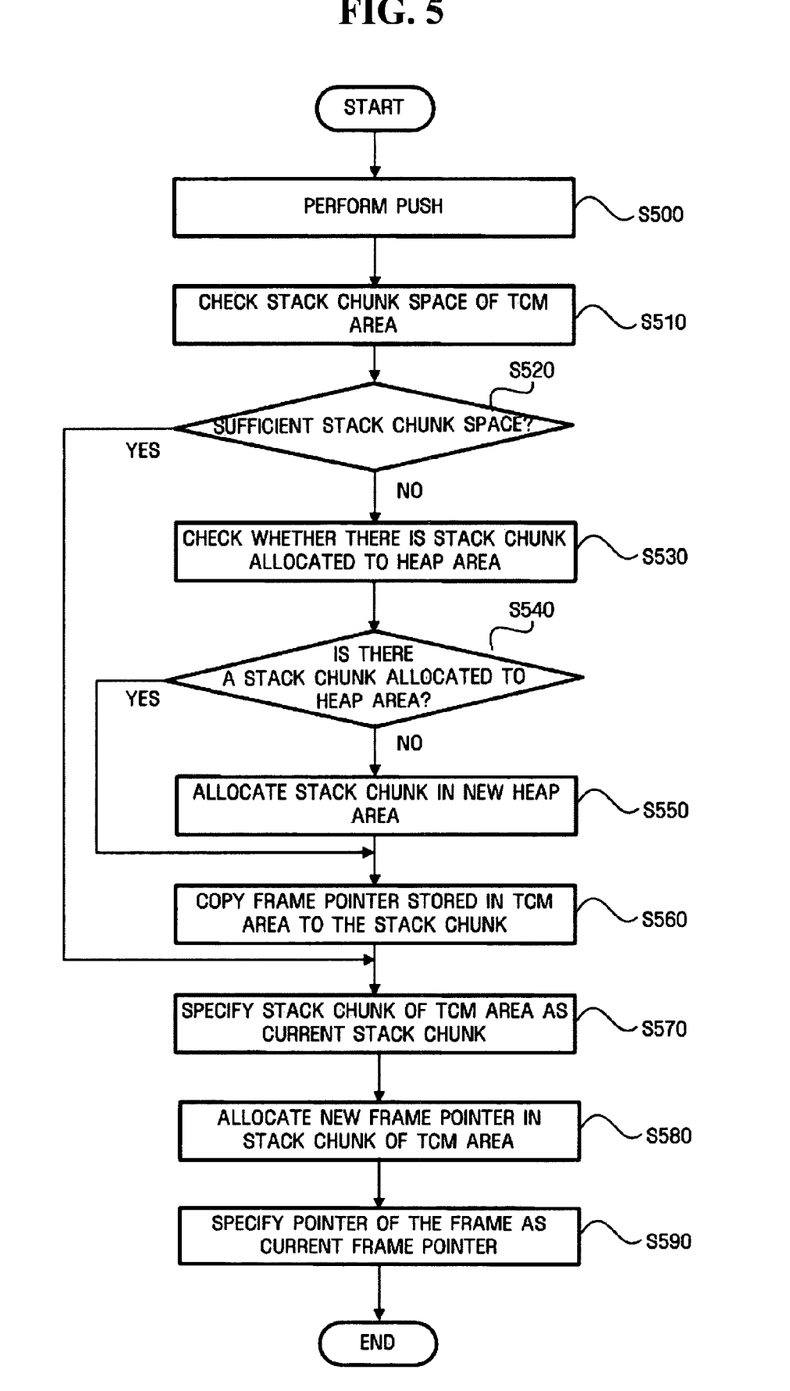
FIG. 5 is a flow chart illustrating a push operation among methods of managing stacks in a virtual machine according to yet another exemplary embodiment of the present invention.

FIG. 5 is a flow chart illustrating a push operation among methods of managing stacks in a virtual machine according to yet another exemplary embodiment of the present invention.

First, if a push is performed (S500), the stack chunk space of the TCM area 410 is checked (S510). Here, the stack chunk space is checked in order to add a new frame pointer.

In the case where the stack chunk space of the TCM area 410 is insufficient (S520), it is checked whether there is a stack chunk allocated to the heap area (S530). Here, the stack chunk allocated in the heap area should have a sufficient space for storing frame pointers stored in the TCM area 410.

Then, the stack chunk of the TCM area 410 is specified as the current stack chunk (S570), and a new frame pointer is allocated to a stack chunk specified as the current stack chunk (S580).

Then, the new frame pointer stored in the stack chunk of the TCM area 410 is specified as the current frame pointer (S590).

Further, in the case where there is a stack chunk in the allocated heap area (S540), frame pointers stored in the TCM area 410 are copied to the stack chunk of the heap area (S560). Then, operations S570 to S590 are performed in the same manner.

Further, in the case where the stack chunk space of the TCM area 410 is sufficient (S520), the stack chunk of the TCM area 410 is specified as the current stack chunk (S570). Then, steps S580 and S590 are performed in the same manner.

Hence, when writing data in a stack, because the data is written in a memory (e.g., a TCM area) directly connected with a processor, the time consumed for the writing is reduced.

Figure 6:
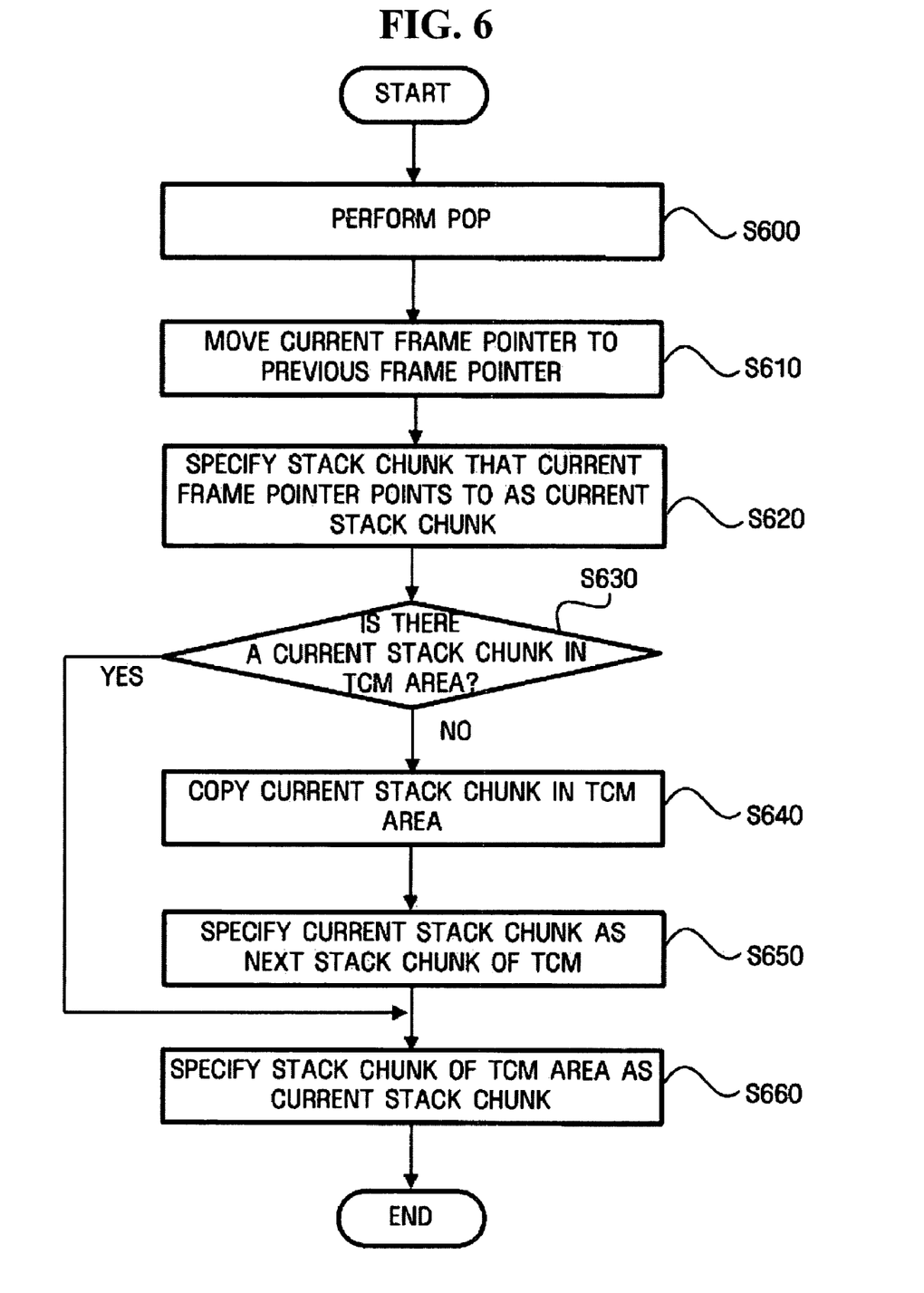
FIG. 6 is a flow chart illustrating a pop operation among methods of managing stacks in a virtual machine according to yet another exemplary embodiment of the present invention.

FIG. 6 is a flow chart illustrating a pop operation among methods of managing stacks in a virtual machine according to yet another exemplary embodiment of the present invention. This pop operation is described with reference to FIGS. 4B and 4C.

First, if a pop is performed, the current frame pointer (e.g., reference numeral 450 in FIG. 4C) is moved to the previous frame pointer (e.g., reference numeral 422) (S600 and S610).

Then, the stack chunk (e.g., reference numeral 421) where there is the current moved frame pointer (e.g., reference numeral 422) is specified as the current stack chunk (S620), and it is checked whether the specified stack chunk (e.g., reference numeral 421) is positioned in the TCM area 410.

In the case where the current stack chunk (e.g., reference numeral 421) is not positioned in the TCM area 410 (S630), the current stack chunk (e.g., reference numeral 421) is copied to the TCM area 410 (S640), and the current stack chunk (e.g., reference numeral 421) is specified as the next stack chunk of the TCM area 410 (S650).

Then, the stack chunk (e.g., reference numeral 411) of the TCM area 410 is specified as the current stack chunk (S660).

Further, in the case where the current stack chunk (e.g., reference numeral 421) is positioned in the TCM area 410 (S630), the stack chunk (e.g., reference numeral 421) is specified as the current stack chunk S660.

Hence, when reading data in a stack, because data is read from a memory (e.g., a TCM area) directly connected with a processor, the time consumed for the reading is reduced.

Figure 7:
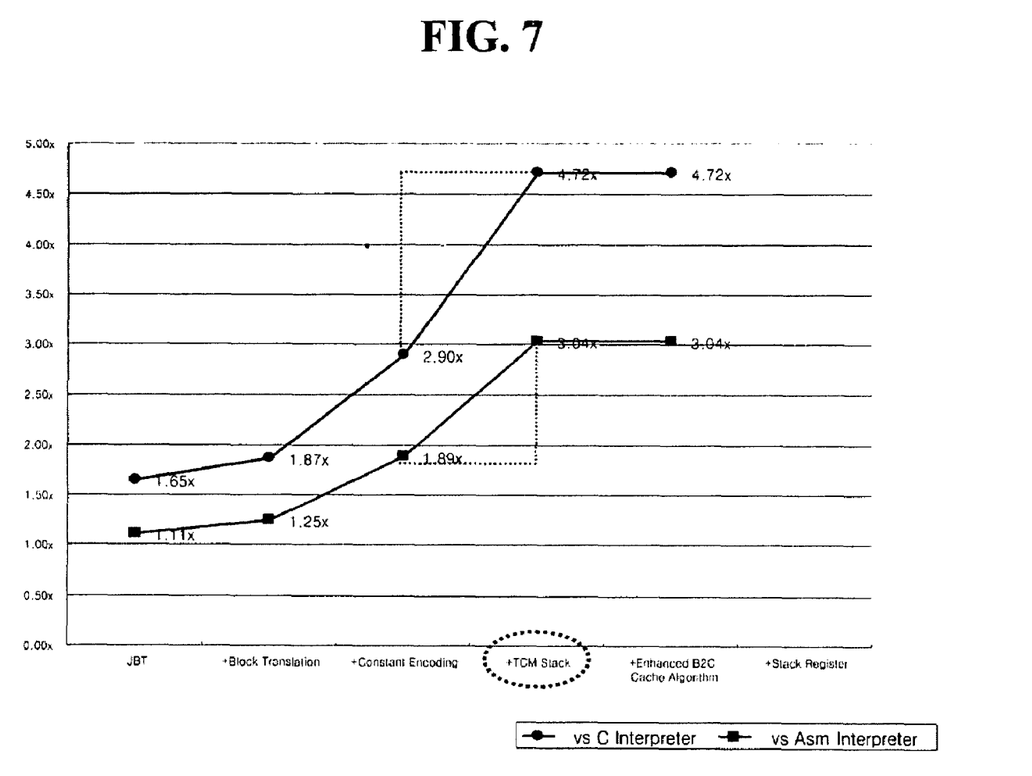
FIG. 7 is a graph showing a result of measuring performance by performing a method of managing stacks in a virtual machine according to yet another exemplary embodiment of the present invention.

FIG. 7 is a graph showing a result of measuring performance by performing a method of managing stacks in a virtual machine according to yet another exemplary embodiment of the present invention.

As illustrated, a stack of Java virtual machine is positioned in the TCM 410, and the performance of the conventional C-Interpreter and the ASM-Interpreter has been compared.

As such, by positioning the stack in the TCM 410, not in an external memory, the performance has been additionally improved by 1.6 times, and the total performance has been improved by 3 to 4 times.

It should be understood by those of ordinary skill in the art that various replacements, modifications and changes may be made in the form and details without departing from the spirit and scope of exemplary embodiments of the present invention as defined by the following claims. Therefore, it is to be appreciated that the above described exemplary embodiments are for purposes of illustration only and are not to be construed as limitations of the invention.

The method and apparatus of exemplary embodiments of the present invention may have the following advantages.

First, when performing a push or pop, a memory (e.g., a TCM) directly connected with a processor is used, and thus stack overhead can be reduced, thereby improving the performance of the virtual machine.

Second, when reading or writing data in a stack, data is read and written in a memory (e.g., a TCM) directly connected with a processor, not through an external bus, and thus the time consumed for the reading or writing is reduced, thereby improving the total performance of a virtual machine.

What is claimed is:

1. An apparatus for managing stacks in a virtual machine, the apparatus comprising:
    a first memory management unit which checks space of a stack chunk of a first memory and allocates a frame pointer if at least one of a push and a pop are performed in a virtual machine; and
    a second memory which is connected with an external bus, and stores frame pointers copied from the first memory via the external bus.

2. The apparatus of claim 1, wherein the first memory directly communicates with a processor without using the external bus.

3. A method of managing stacks in a virtual machine, the method comprising:
    checking a space of a first stack chunk in a first memory if a push is performed in a stack;
    checking whether there is a second stack chunk allocated in a second memory if the space of the first stack chunk is insufficient;
    copying frame pointers stored in the first memory to the second stack chunk of the second memory if the second stack chunk is in the second memory;
    specifying the first stack chunk of the first memory as the current stack chunk, and allocating a new frame pointer to the specified stack chunk; and
    specifying a frame pointer as the current frame pointer.

4. The method of claim 3, wherein a new stack chunk is allocated if the second stack chunk does not exist in the second memory.

5. The method of claim 3, wherein if the frame pointers stored in the first memory are copied to the second memory, a stack-type linked list is changed to an offset type.

6. The method of claim 3, wherein the first memory directly communicates with a processor without using an external bus.

7. A method of managing stacks in a virtual machine, the method comprising:
    moving a current frame pointer to a previous frame pointer if a pop is performed in a stack;
    specifying a stack chunk that the current frame pointer points to a current stack chunk;
    checking whether the specified stack chunk is positioned at a first memory;
    copying the stack chunk to the first memory if the stack chunk is not positioned at the first memory; and
    specifying the stack chunk positioned at the first memory as the current stack chunk.

8. The method of claim 7, wherein if copying the stack chunk to the first memory, a stack-type linked list is changed to an offset type.

9. The method of claim 8, wherein the first memory directly communicates with a processor without using an external bus.

* * * * *